Patented Oct. 5, 1954

2,690,973

UNITED STATES PATENT OFFICE 2,690,973

PRINTING INK AND VARNISH THEREFOR

Andries Voet, Borger, Tex., assignor to J. M. Huber Corporation, Locust, N. J., a corporation of New Jersey No Drawing. Application April 17, 1952, Serial No. 282,898

8 Claims. (Cl. 106—20)

This invention relates to printing inks and varnishes therefor and, more particularly, to printing inks and varnishes which dry rapidly to form nontacky and water-insoluble films.

Printing inks consist of a vehicle, commonly called a varnish, and a coloring agent, the combination forming a mixture with flow characteristics which permit its distribution over the printing plate and its transfer from the printing plate to the surface to be printed. Ordinary news ink is composed largely of mineral oil and carbon black to which a wetting agent, such as gilsonite or rosin, is added to produce the desired flow characteristics. Such inks, when applied to a porous surface, dry by absorption of the oil into the printed material and filtration of the carbon black which remains on the surface. Other non-penetrating inks dry by evaporation of the solvent at room temperature or at elevated temperatures, by oxidation of the vehicle, or by precipitation of resins from the solvents by the application of moisture. This type of ink is exemplified by U. S. Patent 2,118,431 to Albert E. Gessler.

Inks which dry too slowly, produce offset printing, either by direct or by indirect transfer of the ink from one printed sheet to another. Inks, containing solvents which can be evaporated, are most commonly dried rapidly by the application of heat which usually leaves the resinous binder on the surface of the paper in such a softened condition that the sheets tend to stick to each other. Other inks, which employ more or less water as the vehicle, produce films which are more or less water-soluble whereby the ink smears readily when the printed sheet becomes wet.

In my Patent No. 2,525,433, I have disclosed printing inks in which the vehicles or varnishes are solutions of lignin in water-miscible organic solvents, the lignin forming the binder for the coloring agent. Since lignin is infusible and insoluble in water, such inks form nontacky water-insoluble films or prints. However, it is frequently desirable to produce inks of higher viscosity and body than can be readily obtained by dissolving lignin in such organic solvents, or to produce inks of comparable viscosity and body with smaller amounts of binder. Also, because of the cost of the organic solvents, it is desirable to replace a substantial proportion of the organic solvent with water.

The inks and varnishes of my Patent 2,525,433 will tolerate only a relatively small, limited quantity of water without precipitation of the lignin therefrom. That is, when more than such limited amount of water is added to the inks, the lignin will be immediately precipitated from the ink, carrying with it the coloring agent and any resinous material present therein. For example, 20% solutions of lignin in Cellosolve, diethylene glycol and formamide will tolerate only 100%, 20% and 10% of water, respectively. Furthermore, since the lignin is insoluble in water, any water added to such inks does not replace the organic solvent but merely acts as a diluent and decreases the viscosity and body of the inks.

It is an object of my present invention to provide novel ink varnishes, suitable for the preparation of printing inks. Another object is to provide printing inks and varnishes which will dry rapidly and leave a nontacky film. A further object is to provide printing inks and varnishes which have good adherence to paper and form water-insoluble dried films. A still further object is to provide printing inks and varnishes which contain, or which can be mixed with, large volumes of water without precipitation of the binder therefrom and which will have desirable viscosity, body, and flow characteristics. Other objects are to provide new compositions of matter and to advance the art. Still other objects will appear hereinafter.

The above and other objects may be accomplished in accordance with my invention which comprises dissolving certain lignin salts in suitable liquid vehicles to produce ink varnishes, and employing such ink varnishes for the preparation of printing inks by incorporating coloring agents therein. The lignin salts are those formed by neutralizing one or both of the acidic groups of lignin with a nitrogenous base which is soluble in water to the extent of at least 5% by weight and which has a dissociation constant between $1 \times 10^{-3}$ and $1 \times 10^{-7}$. The liquid vehicle is composed of at least one aliphatic organic solvent of the class of formamide and neutral water-miscible glycols, ethers of glycols and esters of glycols which contain from 2 to 8 carbon atoms and only carbon, hydrogen and oxygen and in which lignin is soluble to the extent of at least 5% by weight, and mixtures of such organic solvents with up to about 2 parts by weight of water for each part of the organic solvents. Such solution should contain not more than 0.55 milliequivalent, per gram of lignin in the lignin salt, of a free base having a dissociation constant between $1 \times 10^{-3}$ and $1\times10^{-7}$ and a vapor pressure of less than 17 mm. of mercury at 20° C.

I have found that such printing inks and varnishes will dry rapidly to leave a nontacky, water-insoluble film which has good adherence to paper. The lignin salts are more soluble in the organic solvents than free lignin, and produce higher viscosity and body in the solution than do equal amounts of free lignin. Thus, the lignin salts make it possible to produce printing inks and varnishes with higher viscosity and body than can be obtained by the use of free lignin, or to produce comparable viscosity and body with lesser amounts of binder. Also, satisfactory properties will be retained even if a considerable amount of water is added to the solutions of the lignin salts in the organic solvents. The lignin salts of my invention are slightly soluble in water, in the absence of alkali metals and large excessive amounts of the bases. Furthermore, the solutions of the salts in the organic solvents usually have a greater tolerance for water than the corresponding solutions of free lignin, and hence they can be mixed with considerably larger quantities of water without causing rapid or immediate precipitation of the varnish or ink. In most cases, up to 2 parts by weight of water can be added for each part of the organic solvent to obtain a suitable varnish or ink having desirable viscosity and body.

Lignin is a substance which occurs along with with the cellulose, the sugar substances and the resins in woody fibers. It is extracted from wood during the process of making paper pulp and remains in the black liquor after the separation of the tall oil. Common methods for the preparation of paper pulp are the alkali process and the sulfate process, both of which produce lignin. That, obtained by the sulfate process, is known as sulfate lignin. That, obtained by the alkali process, is known as alkali lignin and, when the alkali is sodium, frequently as sodium lignin. Lignin is also obtained by extraction from wood by various solvents, such as ethyl alcohol. The lignin, obtained by these various methods, is insoluble in water but soluble in aqueous alkali solutions. It is not a resin and does not have the characteristic properties of resins; e. g., it does not have a conchoidal fracture and does not heat soften as resins do. It is acidic, forming monobasic and dibasic salts and requiring about 2.2 milliequivalents of base per gram of lignin to fully satisfy its acidic properties and form the dibasic salt. The term "lignin," as employed herein and in the claims, is employed in the strict sense to mean such extracted free lignin, and does not include derivatives of lignin, such as the water-soluble lignosulfonates obtained by the sulfite process or the salts of such lignosulfonates. It will be understood that the salts of lignin of my invention are the salts of such extracted free lignin.

The organic solvents, to be employed as the liquid vehicles in accordance with my invention, are water-miscible organic solvents in which lignin is soluble to the extent of at least 5% by weight. Lignin is soluble in many organic water-miscible solvents. Preferably, the organic solvent, employed in accordance with my invention, is one in which lignin is soluble to the extent of at least 40% by weight. However, the organic solvent may be one which has a lower solubility for lignin, although, in every case, the organic solvent should be one in which lignin is soluble to the extent of at least 5% by weight.

Suitable solvents are the glycols, ethers of the glycols, esters of the glycols, and formamide. The glycols, their ethers and esters, which contain from 2 to 8 carbon atoms and only carbon, hydrogen and oxygen, will generally be preferred, including the poly glycols. However, poly glycols, having a molecular weight of about 600 and above, are not water-miscible and hence will not be suitable. Representative glycols, which are satisfactory and in which lignin is soluble to the extent of at least 40% by weight at 30° C., are ethylene glycol, diethylene glycol, dipropylene glycol, butylene glycol-1,2, Cellosolve, butyl cellosolve, monobutyl ether of ethylene glycol, monomethyl ether of ethylene glycol, monoethyl ether of ethylene glycol, monomethyl ether of diethylene glycol, monoethyl ether of diethylene glycol, monobutyl ether of diethylene glycol, ethylene glycol monomethyl ether acetate, diethylene glycol monoethyl ether acetate and triethylene glycol methyl ether acetate.

Lignin is soluble in formamide to the extent of a little more than 5% by weight at 30° C. and to the extent of about 20% at 100° C., from which the excess lignin will separate very slowly on cooling. Considerably larger amounts of lignin can be incorporated in formamide, part dissolving and the excess forming a highly dispersed, substantially colloidal suspension from which the excess undissolved lignin will separate quite slowly on standing. On the other hand, the lignin salts of my invention are soluble in formamide at room temperature to the extent of at least 33% to form solutions which are stable on standing, i. e., from which the salts do not separate.

The printing inks and varnishes of my invention may contain no water. However, for economic reasons, it is frequently desirable to produce inks and varnishes in which water forms a considerable portion of the liquid vehicle. In general, the solutions of the lignin salts of my invention in the organic solvents are compatible with up to 2 or more parts by weight of water for each part of organic solvent, i. e., such amounts of water can be added to the solutions without immediate precipitation of the lignin or its salt. However, quantities of water, materially in excess of 2 parts, are undesirable as the lignin salt tends to hydrolyze in the presence of excessive amounts of water and gradually precipitate free lignin.

Therefore, one-third or more of the total liquid vehicle or solvent mixture should be composed of one or more of the organic solvents so as to limit the hydrolysis of the lignin salt and thus to provide printing inks and varnishes which will be stable over extended periods of time.

When water is added to a solution of the lignin salt in one of the organic solvents, the solution first becomes less viscous. Upon the addition of more water, the solution becomes more viscous until, when an excessive amount of water is added, a solid, transparent gel is formed. The ratio of water to organic solvent, required for gelation to set in, depends upon the temperature, the concentration of lignin salt, and the nature of the solvent. For example, with good solvents such as dipropylene glycol and diethylene glycol at room temperature, equal quantities of water, organic solvent and lignin salt form free-flowing varnishes. Increasing the water content will gradually cause gelation, but, with lower concentrations of the lignin salt, larger amounts of water can be added without causing gelation.

With either formamide or ethylene glycol alone as the organic solvent, much smaller quantities of water will cause gelation.

The nitrogenous bases, which are employed to form the lignin salts of my invention, have a dissociation constant between $1 \times 10^{-3}$ and $1 \times 10^{-7}$. Stronger bases, such as sodium hydroxide, produce water-soluble films. Weaker bases, such for example as hydroxylamine with a dissociation constant of $1 \times 10^{-8}$, do not form lignin salts and do not cause the lignin to dissolve satisfactorily in the solvents or solvent mixtures. Also, the nitrogenous bases must be soluble in water to the extent of at least 5% by weight in order to produce lignin salts which will dissolve in the organic solvents and liquid vehicles of my invention. Bases, such as octadecylamine, octylamine, and cyclohexylamine, which are very slightly soluble in water, produce lignin salts which swell, but do not dissolve, in the organic solvents and liquid vehicles of my invention. Representative bases, which have dissociation constants between $1 \times 10^{-3}$ and $1 \times 10^{-7}$ and which are satisfactory for use in accordance with my invention, are:

| | |
|---|---|
| 2 - amino-2-methyl-1,3-propanediol | Ethanol amine |
| Ammonia | Diethanol amine |
| Ethyl amine | Triethanol amine |
| Diethylamine | Morpholine |
| Di-n-butyl amine | Piperidine |
| Triethyl amine | Isopropyl amine |
| Ethylene diamine | 2-amino-2-methyl 1-propanol |
| Diethylene triamine | Benzyl amine |
| Triethylene tetramine | Isobutyl amine |
| Tetraethylene pentamine | Hydrazine |
| | 2-amino-2-methyl pentane-diol |

The following bases are unsatisfactory for producing lignin salts for use in my invention either because the dissociation constant is less than $10^{-7}$ or because the solubility in water is less than 5 percent.

| | |
|---|---|
| Aniline | p-Phenylene diamine |
| p-Toluidine | Hydroxylamine |
| Pyridine | Octadecylamine |
| Quinoline | Dioctyl amine |
| Dibenzyl amine | Ethyl hexylamine |
| Alpha-naphthylamine | Cyclohexyl amine |
| Beta-naphthylamine | Hexamethylene tetramine |
| m-Phenylene diamine | Urea |

When the ink is to be dried or set at atmospheric temperatures, as in the case of a gravure ink, the base is preferably a volatile base; that is, a base which will volatilize readily at atmospheric temperatures and pressures. Such bases should have a vapor pressure of at least 17 mm. of Hg at 20° C., and are represented by ammonia, ethylamine, diethylamine, triethylamine, isopropylamine, isobutylamine and piperidine. The volatile bases readily and rapidly leave the printed films at room temperatures and pressures, leaving free lignin as the binder.

When the ink is to be set by heat, steam, or moisture, it will generally be preferred to employ the less volatile bases, i. e., bases having a vapor pressure of less than 17 mm. of Hg at 20° C. The lignin salts of my invention appear to be somewhat unstable and rapidly decompose to free lignin and free base upon the application of heat or steam, the base is removed by the heat or steam, so that the final dried film is composed essentially of free lignin. Ethanol amine, ethylene diamine, n-butyl amine, hydrazine, and bases of corresponding volatility are particularly desirable in heat set inks. The least volatile bases are usually preferred for inks to be set by steam or moisture.

It is a peculiar fact that, even though the lignin salts are slightly soluble in water, the inks and varnishes of my invention can be set by flowing water over the printed sheet, apparently due to a rapid hydrolysis of the salts by the excess of water on the thin films coupled with the affinity of the lignin for cellulosic materials. Also, the inks and varnishes of my invention can be set by the addition of a suitable acidic material having a dissociation constant greater than about $1 \times 10^{-5}$, such as formic acid, acetic acid and sulfur dioxide. Preferably, such acidic substances are applied in vapor form admixed with steam or in aqueous solution, as they are more effective when so applied, such combination also being more effective than either steam or moisture alone.

The lignin salts of my invention are most conveniently formed by mixing the lignin, the base and the solvent and heating the mixture at a temperature from about 60° C. to about 70° C., whereupon the salts are formed at a rapid rate. They are formed more slowly at lower temperatures but, even at room temperatures, most of the salts are formed within 24 hours. The formation of the salt can be readily observed by mixing the lignin with an aqueous-solvent mixture, in which the lignin is insoluble, and then adding the base, whereupon the lignin dissolves due to the formation of its salt.

The amount of base, employed to form the salt, should be sufficient to neutralize at least one of the acidic groups of the lignin, i. e., at least sufficient to form the monobasic salt. This requires at least 1.1 milliequivalents of base for each gram of lignin. If too little base is used, a portion of the lignin will remain as a powder suspended in the solution, which powder acts merely as an uneconomical and inferior filler and does not act as a binder, and also acts to decrease the water tolerance of the varnish or ink so that it is no longer compatible with large quantities of water but will tolerate only smaller limited amounts of water. About 2.2 milliequivalents of base per gram of lignin is required to completely neutralize the acidic characteristics of the lignin and form the dibasic salt. Usually, the amount of base will be from 1.1 to about 2.2 milliequivalents and, preferably, about 2.2 milliequivalents. Somewhat larger amounts of base may be employed, but should not exceed about 25% above that required to form the dibasic salt unless the base is a volatile base. In other words, if the base has a vapor pressure of less than 17 mm. of Hg at 20° C., it should not be employed in excess of 2.75 milliequivalents per gram of lignin. Larger amounts of such relatively non-volatile bases produce water-soluble films, i. e., the lignin salts are quite soluble in water in the presence of larger excesses of the bases. However, larger excesses of the volatile bases (those having a vapor pressure of at least 17 mm. of Hg at 20° C.) are not harmful and do not produce water-soluble films, because such bases rapidly leave the film at atmospheric temperatures and pressures during the drying of the film.

The amount of lignin salt employed will depend upon the viscosity desired in the varnish and in the ink. Usually, the lignin salt will constitute from about 10% to about 40% by weight of the varnish and, preferably, from about 17% to about 30%.

The varnishes and inks of my invention, when spread in the form of a thin film and dried, become insoluble in water. This is true even though the basic material, employed to prepare the salt of lignin, is a relatively nonvolatile substance, such as the ethanol amines. This is an unexpected result which, I believe, is due to hydrolysis of the salt, or other decomposition thereof, which permits the base to be carried away by the solvent or solvent mixture. Whether or not a film is water-proof, may be readily shown by a simple test. The varnish or ink is applied to glass or metal, such as aluminum foil, so as to form a film thereon. After drying, the coated glass or metal is immersed in water at room temperature. A water-soluble film will dissolve more or less rapidly to form a clear liquid. The varnishes and inks of my invention, when so tested, may or may not remain adhered to the glass or metal but do not dissolve in the water and, hence, form water-insoluble films. It is not possible to evaluate the water solubility of films applied to absorbent paper because other phenomena occur. When a film which is soluble in water, is applied to paper, the pigment and the binder will frequently penetrate into the pores of the paper and be held therein mechanically so as to give an appearance of being water-insoluble. Also, since many of the constituents of varnishes and inks have a great affinity for cellulosic materials, they will be adsorbed by the paper and adhere thereto and thus appear to be water-insoluble, even though they are water-soluble when applied to non-adsorbent materials such as glass and metals.

The varnishes of my invention may be employed in any conventional manner for the preparation of printing inks by incorporating the usual coloring materials therein. Colored pigments may be incorporated into the varnishes by means of a roller mill or a ball mill, or wet filter cakes of the pigment may be stirred into the varnish and dispersed therein. In other cases, the ink may be formed by the addition to the varnish of soluble dyestuffs as the coloring agents. Suitable pigments include carbon black, titanium dioxide, red pigment, milori blue, and the like.

The amount of pigment employed will be that ordinarily used to provide inks of the desired color and viscosity. Usually, the pigment will be in a proportion of from about 2% to about 60% by weight based on the liquid medium of the varnish. In the case of carbon black, the amount will be from about 2% to about 31% by weight of the liquid medium and, preferably, from about 9% to about 31%.

In order to more clearly illustrate my invention, preferred modes of carrying the same into effect, and the advantageous results to be obtained thereby, the following examples are given, in which amounts are by weight except where otherwise specifically indicated.

EXAMPLE I

Portions of a 20% solution of lignin in Cellosolve were reacted with varying amounts of 2-amino-2-methyl pentane diol. Films were cast on aluminum foil and dried in the air at room temperature. Each freshly dried film was placed in a tray, having inside dimensions slightly larger than the film area. Water, at room temperature, was then added to a height of 0.5 cm., and the behaviour of the film was observed. When the amounts of base employed were just sufficient to form the monobasic salt and the dibasic salt of lignin (about 1.3 and 2.6 grams, respectively, for each 10 grams of lignin), the films were water-insoluble. An amount of base, equal to a 10% excess of that required to form the dibasic salt (a total of 2.42 milliequivalents of base), did not affect the water-insolubility of the film. When the base was employed in 25% excess (a total of 2.75 milliequivalents of base), the film appeared to swell and soften and to show signs of being partly soluble in water. When a 50% excess of base (a total of 3.3 milliequivalents of base) was employed, the film was completely water-soluble, dissolving in the water to a clear liquid. Still larger excesses of base (100% and 200% excesses) also gave completely water-soluble films.

EXAMPLE II 30 grams of sulfate lignin were dissolved in 65 grams of dipropylene glycol at 70° C. The solution was cooled to 55° C., and 5 grams of 26° B ammonium hydroxide was added, approximately 2.9 milliequivalents of NH4OH per gram of lignin. The varnish was dark brown in color, had a viscosity of about 60 poises at 25° C. and had good length—that is, it would pour to form a long unbroken thread. This varnish was converted to an ink by dissolving 3 grams of Congo red in it.

A film of this varnish, formed by spreading on a non-absorbent, coated paper, did not dissolve when immersed in water. A similar film, in which the ammonia was replaced with an equivalent amount of caustic soda, gave a film which was water-soluble.

EXAMPLE III 30 grams of sulfate lignin were dissolved in a mixture of 30 grams of butylene glycol-1,2 and 35 grams of formamide, by warming the ingredients at 60° C. 5 grams of concentrated ammonium hydroxide, containing 29.8% ammonia and having a specific gravity of 0.897 at 20° C., were then added. This was approximately 2.9 milliequivalents of NH4OH per gram of lignin. A varnish of good body and length resulted which, when applied to a surface of aluminum foil and dried, gave a film which was insoluble in water. This varnish was converted into a black ink, suitable for printing on a coated paper stock, by the incorporation of 9 grams of carbon black by means of a 3 roller mill.

EXAMPLE IV 17 grams of sulfate lignin were dispersed in a mixture of 30 grams of diethylene glycol and 50 grams of water, in which mixture the lignin is insoluble. The resulting mixture was a thin liquid with none of the viscous properties and length required in an ink varnish. The lignin was brought into solution by the addition of 3 grams of concentrated ammonium hydroxide, containing 29.8% ammonia and having a specific gravity of 0.897 at 20° C. (approximately 3.1 milliequivalents of NH4OH), to form a varnish with good body and length and suitable for the production of a low temperature heat set ink by the incorporation of color. A varnish of still greater volatility was prepared by replacing the diethylene glycol with formamide. Each of these varnishes, when applied to a glass surface, dried to give water-insoluble films. When the ammonia in these varnishes was replaced by potassium hydroxide, the films were soluble in water.

EXAMPLE V

In order to show the improvement in viscosity obtained with the lignin salts of my invention, solutions were prepared with (1) free lignin, (2) the monobasic ammonium salt of lignin, and (3) the dibasic ammonium salt of lignin, in each of formamide and diethylene glycol. The amounts of free lignin and of its salts, employed in the respective solutions, were such that each solution contained 33% by weight of lignin. The viscosities of the solutions, in poises, are shown in the following table:

*Table*

In formamide:                 poises at 27° C.
(1) Free lignin_____ 25
(2) Monobasic ammonium salt of lignin__ 80
(3) Dibasic ammonium salt of lignin____ 96

In diethylene glycol:            Poises at 30° C.
(1) Free lignin_____ 9
(2) Monobasic ammonium salt of lignin__ 16
(3) Dibasic ammonium salt of lignin____ 18

EXAMPLE VI 27.5 grams of sulfate lignin was dissolved in 36 grams of ethylene glycol monomethyl ether and 32 grams of water with the aid of 4.5 grams (approximately 2.2 milliequivalents) of diethyl amine. This produced a varnish of good length and with a viscosity of 18 poises at 25° C. An ink was produced from this varnish by the incorporation of 6 grams of barium lithol red by means of a 3 roller ink mill. The orange brown ink, when printed on non-absorbent, coated magazine paper and dried by passing over a steam heated roll, gave a print which was not affected by immersion in water.

EXAMPLE VII

A varnish was prepared from 26 grams of alkali lignin, 50 grams of dipropylene glycol, 19 grams of water and 5 grams (approximately 2.2 milliequivalents) of morpholine. The resulting varnish had good length, a viscosity of 12 poises at 25° C. and dried to give a water-insoluble film.

EXAMPLE VIII 24 grams of sulfate lignin were dissolved in 50 grams of diethylene glycol and 18 grams of water with the aid of 8 grams (approximately 2.2 milliequivalents) of triethanol amine. The resulting varnish had good body and length. It was converted into an ink by grinding with 10 grams of carbon black. When printed on news stock, the resulting ink was smudge resistant and water-insoluble.

EXAMPLE IX

Solutions were made with 27 parts of water-soluble soda lignin (the sodium salt of lignin), 27–36 parts of formamide, 18–27 parts of water and 5 parts of urea. When such solutions were applied to a non-absorbent base, such as glass or aluminum foil, and dried, they were completely water-soluble. On absorbent paper, there is a semblance of waterproofness, due to the penetration of the material into the paper.

EXAMPLE X

Mixtures were made up of the following ingredients in the indicated parts by weight:

|   | A | B |
|---|---|---|
| Soda Lignin | 26 | 24 |
| Formamide | 34 | 33 |
| Water | 16 | 15 |
| 2-Methyl-2,4-pentandiol | 4 | 4 |
| Hexamethylene tetramine | 5 | |
| Triethanolamine | 1 | 1 |

In each case, the triethanolamine was insufficient to form a salt with the bulk of the lignin which, upon the casting of films, formed the bulk of such films. The hexamethylene tetramine is too weak to form a salt with the lignin, such base having a dissociation constant of $1 \times 10^{-9}$. The addition of a slight amount of water to each of such mixtures resulted in complete precipitation of the lignin.

Examples IX and X are included for purposes of comparison and do not constitute embodiments of my invention.

It will be understood that the preceding examples have been given for illustrative purposes solely and that my invention is not limited to the specific embodiments disclosed therein. On the other hand, it will be readily apparent to those skilled in the art that many variations can be made in the bases and solvents employed, in the proportions of the ingredients, and in the techniques used, within the limits hereinbefore set forth, without departing from the spirit and scope of my invention.

The inks of my invention, prepared from the varnishes of the preceding examples, are suitable for high speed printing of coated magazine stock and will dry with the application of very little heat to give a hard and rubproof print which is insoluble in water and which exhibits almost no offset or show through. Such inks also give sharp reproduction on newsprint to produce a sheet which does not offset during printing and which will not smear or rub off. The inks may be set by the application of heat, steam, or water, or by the addition of acid, preferably in aqueous solution or in admixture with steam.

While I have disclosed the use of lignin salts alone as the binder and viscosity improving agent in the inks, it is also possible to include small amounts of materials, such as rosin and casein, which are soluble in aqueous solutions of alkali hydroxide. However, such materials should not usually be employed in amounts exceeding about half the weight of the lignin salt, as larger amounts tend to seriously affect the water tolerance of the varnishes and the inks.

It will be apparent that, by my invention, I have provided novel varnishes and printing inks which have many valuable advantageous properties. The varnishes and inks, which contain large amounts of water, are particularly valuable because of their relatively low cost. Accordingly, it will be apparent that my invention constitutes a valuable contribution to and advance in the art.

I claim:

1. An ink varnish consisting essentially of a liquid vehicle of the class consisting of at least one aliphatic organic solvent of the class consisting of neutral water-miscible glycols, aliphatic ethers of glycols and aliphatic esters of glycols which glycols, ethers and esters contain from 2 to 8 carbon atoms and only carbon, hydrogen and oxygen and in which lignin is soluble to the extent of at least 5% by weight, and mixtures of such organic solvents with up to about 2 parts by weight of water; from about 10% to about 40% by weight of a lignin salt of a nitrogenous base which is soluble in water to the extent of at least 5% by weight and which has a dissociation constant between $1 \times 10^{-3}$ and $1 \times 10^{-7}$; and not more than 0.55 milliequivalents per gram of lignin in the lignin salt of a free base having a dissociation constant between $1 \times 10^{-3}$ and $1 \times 10^{-7}$ and a vapor pressure of less than 17 mm. of mercury at 20° C.

2. An ink varnish consisting essentially of a liquid vehicle of the class consisting of at least one aliphatic organic solvent of the class consisting of neutral water-miscible glycols, aliphatic ethers of glycols and aliphatic esters of glycols which glycols, ethers and esters contain from 2 to 8 carbon atoms and only carbon, hydrogen and oxygen and in which lignin is soluble to the extent of at least 5% by weight, and mixtures of such organic solvents with up to about 2 parts by weight of water, having dissolved therein from about 10% to about 40% by weight of lignin and at least 1.1 milliequivalents per gram of the lignin of a nitrogenous base which is soluble in water to the extent of at least 5% by weight and which has a dissociation constant between $1 \times 10^{-3}$ and $1 \times 10^{-7}$ but not more than 2.75 milliequivalents of such a base which has a vapor pressure of less than 17 mm. of mercury at 20° C.

3. An ink varnish consisting essentially of a liquid vehicle of the class consisting of at least one aliphatic organic solvent of the class consisting of neutral water-miscible glycols, aliphatic ethers of glycols and aliphatic esters of glycols which glycols, ethers and esters contain from 2 to 8 carbon atoms and only carbon, hydrogen and oxygen and in which lignin is soluble to the extent of at least 5% by weight, and mixtures of such organic solvents with up to about 2 parts by weight of water; from about 10% to about 40% by weight of a lignin salt of a nitrogenous base which is soluble in water to the extent of at least 5% by weight and which has a dissociation constant between $1 \times 10^{-3}$ and $1 \times 10^{-7}$; and substantially no free base.

4. An ink varnish consisting essentially of a liquid vehicle of the class consisting of at least one aliphatic organic solvent of the class consisting of neutral water-miscible glycols, aliphatic ethers of glycols and aliphatic esters of glycols which glycols, ethers and esters contain from 2 to 8 carbon atoms and only carbon, hydrogen and oxygen and in which lignin is soluble to the extent of at least 5% by weight, and mixtures of such organic solvents with up to about 2 parts by weight of water; from about 10% to about 40% by weight of a dibasic lignin salt of a nitrogenous base which is soluble in water to the extent of at least 5% by weight and which has a dissociation constant between $1 \times 10^{-3}$ and $1 \times 10^{-7}$; and not more than 0.55 milliequivalent per gram of lignin in the lignin salt of a free base having a dissociation constant between $1 \times 10^{-3}$ and $1 \times 10^{-7}$.

5. An ink varnish consisting essentially of a liquid vehicle of the class consisting of at least one aliphatic organic solvent of the class consisting of neutral water-miscible glycols, aliphatic ethers of glycols and aliphatic esters of glycols which glycols, ethers and esters contain from 2 to 8 carbon atoms and only carbon, hydrogen and oxygen and in which lignin is soluble to the extent of at least 5% by weight, and mixtures of such organic solvents with up to about 2 parts by weight of water; from about 10% to about 40% by weight of a lignin salt of a non-volatile nitrogenous base which is soluble in water to the extent of at least 5% by weight and which has a dissociation constant between $1 \times 10^{-3}$ and $1 \times 10^{-7}$; and not more than 0.55 milliequivalent per gram of lignin in the lignin salt of a free base having a dissociation constant between $1 \times 10^{-3}$ and $1 \times 10^{-7}$.

6. An ink varnish consisting essentially of a liquid vehicle of the class consisting of at least one aliphatic organic solvent of the class consisting of neutral water-miscible glycols, aliphatic ethers of glycols and aliphatic esters of glycols which glycols, ethers and esters contain from 2 to 8 carbon atoms and only carbon, hydrogen and oxygen and in which lignin is soluble to the extent of at least 5% by weight, and mixtures of such organic solvents with up to about 2 parts by weight of water; from about 10% to about 40% by weight of a lignin salt of a non-volatile nitrogenous base which is soluble in water to the extent of at least 5% by weight and which has a dissociation constant between $1 \times 10^{-3}$ and $1 \times 10^{-7}$; and substantially no free base.

7. An ink consisting essentially of coloring matter; a liquid vehicle of the class consisting of at least one aliphatic organic solvent of the class consisting of neutral water-miscible glycols, aliphatic ethers of glycols and aliphatic esters of glycols which glycols, ethers and esters contain from 2 to 8 carbon atoms and only carbon, hydrogen and oxygen and in which lignin is soluble to the extent of at least 5% by weight, and mixtures of such organic solvents with up to about 2 parts by weight of water; from about 10% to about 40% by weight of a lignin salt of a nitrogenous base which is soluble in water to the extent of at least 5% by weight and which has a dissociation constant between $1 \times 10^{-3}$ and $1 \times 10^{-7}$; and not more than 0.55 milliequivalents per gram of lignin in the lignin salt of a free base having a dissociation constant between $1 \times 10^{-3}$ and $1 \times 10^{-7}$ and a vapor pressure of less than 17 mm. of mercury at 20° C.

8. An ink consisting essentially of coloring matter; and a liquid vehicle of the class consisting of at least one aliphatic organic solvent of the class consisting of neutral water-miscible glycols, aliphatic ethers of glycols and aliphatic esters of glycols which glycols, ethers and esters contain from 2 to 8 carbon atoms and only carbon, hydrogen and oxygen and in which lignin is soluble to the extent of at least 5% by weight, and mixtures of such organic solvents with up to about 2 parts by weight of water, having dissolved therein from about 10% to about 40% by weight of lignin and at least 1.1 milliequivalents per gram of the lignin of a nitrogenous base which is soluble in water to the extent of at least 5% by weight and which has a dissociation constant between $1 \times 10^{-3}$ and $1 \times 10^{-7}$ but not more than 2.75 milliequivalents of such a base which has a vapor pressure of less than 17 mm. of mercury at 20° C.

References Cited in the file of this patent

UNITED STATES PATENTS

| Number | Name | Date |
| --- | --- | --- |
| 2,449,230 | Irion | Sept. 14, 1948 |